Sept. 28, 1965 C. O. PINGRY III 3,209,340
RECORD POSITIONING APPARATUS
Filed June 2, 1961 2 Sheets-Sheet 1

*INVENTOR.*
CARL O. PINGRY
BY Karl A. Ohralik
ATTORNEY.

Sept. 28, 1965 C. O. PINGRY III 3,209,340

RECORD POSITIONING APPARATUS

Filed June 2, 1961 2 Sheets-Sheet 2

United States Patent Office 3,209,340
Patented Sept. 28, 1965

3,209,340

RECORD POSITIONING APPARATUS

Carl O. Pingry III, Lexington, Ky., assignor to International Business Machines Corporation, New York, N.Y., a corporation of New York Filed June 2, 1961, Ser. No. 114,462
3 Claims. (Cl. 340—174.1)

This invention relates to systems for reading information from an information storage medium and more particularly to a system facilitating the selection of a predetermined portion of an information storage meduim having a message of information recorded thereon and the quick positioning of this portion of the medium relative to a "reading" device to enable subsequent reading of the message of information. While the principle of the invention has general applicability and is adaptable to systems having different recording media, its particular adaptation to a system utilizing magnetic tape as a recording medium will be set forth and described herein.

A magnetic tape is presently a very useful medium for the purpose of storing information, particularly in conjunction with computers and data processing equipment. The tapes are usually long and are capable of storing many messages or "letters" in succession along their lengths. In "reading" this information from the tape, the tape is unwound from one reel, passes by a magnetic information "reading" head and is then wound on another reel. In cases where the several recorded messages on a tape are to be all read in the order in which they appear on the tape, the tape is simply passed by the reading head at a reading speed in the manner described and no particular problem is presented. In other cases, however, wherein it is required to read only a selected message along an intermediate portion of the tape, that is, in which the first message to be read, appears subsequent to other messages recorded on the tape, it is undesirable to read all messages from the beginning of the tape to that message which is required. The reading of such other messages is excessively time consuming since the linear advance of the tape is necessarily slow in cases wherein the recorded information appears in a series of rows extending transversely of the tape and wherein the "reading" head is successively moved along the rows for "reading."

It is thus clear that in situations wherein it is required to "read" a message which is recorded along an intermediate portion of a magnetic tape, it is desirable to conserve time in selecting the desired portion of the tape by moving it rapidly past the "reading" head and stopping it at the beginning of the desired message. The "reading" of such desired message may then be begun. It is also clear that this must be accomplished accurately and reliably. That is, the system should be unresponsive to "noise" recorded on the tape or otherwise appearing and should positively and affirmatively be stopped at the beginning of the desired message.

Accordingly, it is a principal object of this invention to facilitate rapid positioning of a magnetic tape relative to a "reading" head for "reading" of a predetermined message recorded along an intermediate portion of a tape.

It is a further object of this invention to facilitate sensing of a magnetic tape by a magnetic "reading" head to determine the positions of messages recorded on the tape.

In accordance with this invention, a magnetic tape is utilized wherein bits of information of each message are recorded in a series of rows extending transversely along a part of the width of the tape, less than the entire width. These rows of each message are adjacent to each other and are "read" by successively advancing the tape one row at a time as the head moves across the tape and along each row. Each message comprises one or more rows of such recorded information.

In accordance with a feature of this invention, each group of rows comprising a message is separated from an adjacent group at a longitudinally spaced location, by a plurality of bits of information comprising a selection bit group extending longitudinally along the tape and occupying a part of the tape width not occupied by the messages. A "reading" head is provided and the bits of recorded information are such as to represent either a binary "0" or a binary "1" by producing different values of potential in the "reading" head as the tape moves past the head. In seeking a message to be read, the "reading" head is positioned to read the message separating bits which all appear as "1's" as the tape is rapidly moved linearly past the head and the pulses thus produced by the "reading" head are applied to an integrator circuit which is effective to produce an output potential only after a relatively large number of input pulses have been applied. In traveling longitudinally past the "reading" head, the bits of a message do not interfere with the message separating bits since they are recorded over a width of the tape other than the width on which the message separating bits appear. The integrator receives this described input and produces an output pulse for each group of separating bits. Further circuitry responsive to the output of the integrator is effective to count the number of pulses received and to interrupt the energy supplied to a motor for driving the recording tape after a predetermined count designating the number of message desired. Accordingly, the tape may be positioned at any desired message, in position for "reading" by the head. By requiring a relatively large number of input message separating pulses in each group to produce an output from the integrator, the number being predetermined to be greater than the maximum number of noise bits likely to be encountered during normal operation, the possibility of producing a false reading by noise which may be introduced in the system, is virtually eliminated, since noise would not be presented in such an orderly manner and in such a relatively large number of bits in such a short period of time. The integrator circuit is conditioned to reset to zero in response to the omission of two or more bits in the message separating group to further assure that the system will be unresponsive to noise.

The foregoing and other objects, features and advantages of the invention will be apparent from the following more particular description of a preferred embodiment of the invention, as illustrated in the accompanying drawings.

Figure 1:
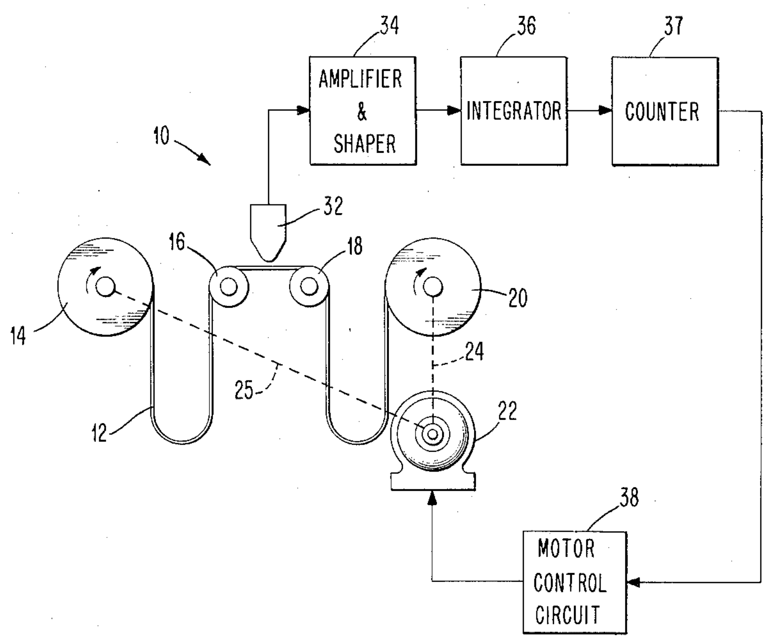
FIGURE 1 depicts a recording system according to the present invention.

Referring to the drawings for a detailed description of the invention, in FIGURE 1, 10 represents the entire system of the invention. In this system, a magnetic tape 12 is utilized as a recording medium and is initially wound on a pay-off reel 14. The tape extends from reel 14, over a pair of spaced idler rollers 16 and 18 and is wound on a take-up reel 20. A suitable driving motor 22 is provided for rotating the reels 20 and 22 and is coupled thereto in a suitable manner, as represented by the dotted lines 24 and 25.

Figure 2:
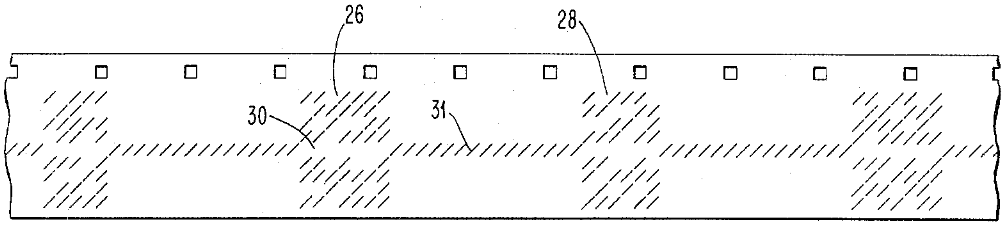
FIGURE 2 depicts a portion of a magnetic tape having message information and message separating bits recorded thereon.

As shown more clearly in FIGURE 2 of the drawings, the tape 12 has messages in the form of bits of binary information recorded thereon. Although the magnetic recording of information on a magnetic tape leaves no visible indication of such recording, it is herein represented by visible lines to facilitate description and explanation of the invention. Typical messages are shown at longitudinally spaced locations 26 and 28 wherein a diagonal line represents a binary "1" and the absence of such a line represents a "0." The bits of information in each message are presented in a plurality of tracks transverse to the longitudinal dimension of the tape and individual bits are also positioned in one of eight different channels extending longitudinally along the tape. A central channel 30 is shown as containing no information in any of the messages. However, in accordance with a feature of this invention, as shown at 31, the portion of the channel 30 which is longitudinally between messages has a series of "1's" recorded thereon in immediate order with no "0's" in any of the spaces between the "1's."

A magnetic head 32 is provided for "reading" the information on the tape 12. For reading the information in messages such as 26 and 28, suitable mechanism, not shown, is provided for moving the head along each track of the message with suitable means for advancing the tape one track increment between successive passes of the head. The information thus "read" by the head is supplied to any suitable computer or other machine, not shown, as the case may be.

Figure 3:
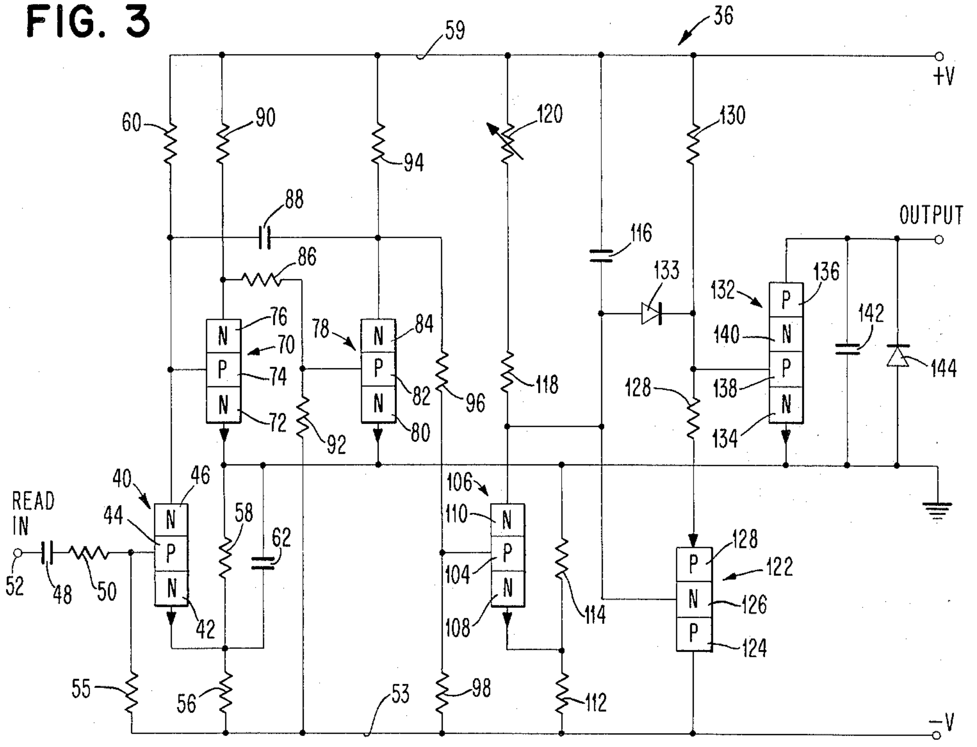
FIGURE 3 represents schematically an electrical circuit diagram of an integrator circuit according to the present invention, and FIGURE 4 graphically shows wave forms of potentials appearing at certain nodes of the circuit shown in FIGURE 3.

As may be understood, an entire reel of magnetic tape may contain a large number of messages. In accordance with a feature of this invention, for determining a desired number of message from any initial position of tape and reading of such desired message by the magnetic head 32, the head is positioned to read the message separating groups of bits recorded along the channel 30 as the tape is passed longitudinally by the head. The output potential produced by the head is represented by wave form 33 and this potential is applied to an amplifier and shaper unit 34 which produces rectangular pulses as represented by wave form 35. This potential is applied to an integrator circuit 36, the details of which are shown in FIGURE 3 of the drawings. The circuit 36 is effective to produce a single potential output pulse in response to the passage of each group 31. These pulses are applied to a counter circuit 37 which may be of a known construction and which is effective to produce an output potential after any preselected number of pulses to its input. The output potential so produced is effective through a motor control circuit 38 to interrupt the flow of energy to motor 22. Thus, in the system 10, in selecting a certain message along the tape 12 and positioning the tape for "reading" by the head 32, the difference in number between the desired message and that at which the head is positioned, is determined and the counter 36 is conditioned to produce an output potential after this predetermined difference in number of pulses has been applied to its input. In "reading" the bits in channel 30 the tape is moved longitudinally by the motor 22 at a rate equal to that at which the head is moved along the tracks in reading information on the tape.

In selecting a lower numbered message from that which is in position to be "read" by the head, the reel may simply be returned to its beginning and the desired message selected in the manner described hereinabove. Alternatively, the head may be positioned for counting the messages passing by as the tape is moved in a reverse direction. In this way it is unnecessary to completely rewind the tape. This is readily possible since "reading" of information on the tape by the head may be achieved by any relative movement between head and tape and in other respects the circuitry operates in the manner described.

As shown in FIGURE 3 of the drawings, the integrator circuit 36 includes an input triggering transistor 40 of the NPN junction type, having an emitter 42, a base 44 and a collector 46. Input potential pulses from the magnetic head 32 are applied through circuit 34 to the base 44 through a series connection of a capacitor 48 and a resistor 50. One terminal of resistor 50 is connected to base 44 and one terminal of capacitor 48 is connected to an input terminal 52. The input pulses are shown at 35 in FIGURE 4 of the drawings wherein the abscissa represents elapsed time and the ordinate represents potential magnitude. The output of circuit 34 delivers pulses as shown at 35 in response to the reading of the "1's" on the magnetic tape by the head 32. A negative potential bias is applied through a line 53 and resistor 55 to the base 44 of transistor 40 from a negative potential source represented by the symbol —V. Alternatively, the potential bias of base 44 may be established by the output stage circuit 34, in which case capacitor 48 and resistor 55 would be obviated. For applying a negative potential bias to the emitter 42 of transistor 40, it is connected to the junction of a pair of resistors 56 and 58 which are serially connected betwen source —V, and ground. These resistors thus form a potential divider and the potential across resistor 56 is applied to the base-emitter junction of transistor 40. A positive potential is applied to collector 46 of transistor 40 from a positive potential source represented by the symbol +V through a line 59 and resistor 60. A decoupling capacitor 62 is directly connected between emitter 42 and ground.

The potential biases applied to the base, emitter and collector of transistor 40 establish an initial condition of very low conduction so that it may be considered cut-off and this transistor together with others hereinafter described, will be referred to as being cut-off when in this condition. A positive potential pulse such as represented by wave form 35 applied at time $t1$ to input terminal 52 establishes heavy conduction to the point of saturation in this transistor whereby the potential of collector 46 drops suddenly to a negative value as shown at this time by wave form 68. At this occurrence, a negative potential pulse is produced at collector 46 which is applied as an input to a monostable multivibrator section of circuit 34. This multivibrator includes a transistor 70 of the NPN junction type with an emitter 72, a base 74, a collector 76 and a transistor 78 also of the NPN junction type having an emitter 80, a base 82 and a collector 84. These transistors are cross coupled so as to have a stable or quiescent state of equilibrium in which transistor 70 is conducting heavily and transistor 78 is cut-off and a transient or unstable state wherein transistor 78 is heavily conducting and transistor 70 is cut-off. The cross coupling includes a resistor 86 connected between collector 76 and base 82 and a capacitor 88 connected between collector 84 and base 74. For applying direct operating potentials to collector 76 and base 82, a resistor 90 is connected between source +V and the collector 76 and a resistor 92 is connected between base 82 and source —V whereby the resistors 86, 90 and 92 form a potential divider across sources —V and +V and potentials at junctions between pairs of resistors are applied to collector 76 and base 82. Similarly, resistors 94, 96 and 98 are serially connected in the order named between source +V and source —V and the junction between resistors 94 and 96 is connected to collector 84 for applying a bias potential to this collector. The resistors 86, 90 and 92 and resistors 94, 96 and 98 are so proportioned as to establish the quiescent state, above described, in the absence of any other influence such as input pulses from the triggering transistor. The emitters 72 and 80 are each grounded. In the quiescent condition, capacitor 88 becomes charged with the terminal which is connected to collector 84, positive with respect to the other terminal.

Figure 4:
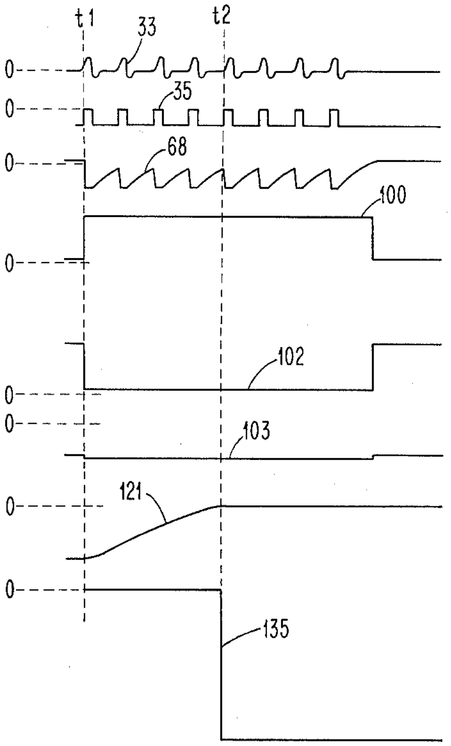

In response to the application of a potential pulse as shown at 68 in FIGURE 4 of the drawings, to base 74 of transistor 70, the multivibrator changes from its quiescent condition to its transient condition in a known manner. The period of time during which the multivibrator remains in its transient condition is dependent upon the time constant of resistor 60 and capacitor 88 since the discharge of capacitor 88 through resistor 60 and transistor 78 determines the potential applied to base 74 of transistor 70 during the transient condition. This discharge maintains transistor 70 cut off until the potential at base 74 rises to a value at which this transistor begins conducting and concomitantly, transistor 78 becomes cut-off. The value of this time constant is controlled in relation to the period of pulses 68 so that the multivibrator will remain in its transient condition for the period of two such pulses but will change to its quiescent condition before the end of the third such period. In this regard it should be observed that due to transistor characteristics, the potential at base 74 at conduction of transistor 70 is somewhat above zero or ground potential as shown in FIGURE 4 of the drawings. The rise of potential as represented by wave form 68, from the minimum value shown, to this slightly positive value, in the absence of input pulses, will require longer than two pulse periods since this potential rise is exponential rather than linear.

A succession of input pulses as shown at 35 producing a succession of pulses as shown at 68 to the input of the multivibrator circuit is effective to maintain the multivibrator in its transient condition. The relatively high potential of collector 76 during this period is represented by the wave form 100 in FIGURE 4 of the drawings and the relatively low potential of collector 84 during this period is represented by the wave form 102 and wave form 103 represents the potential at base 104.

The junction between resistors 86 and 98 is connected to the base 104 of a transistor 106 of the NPN junction type having an emitter 108 and a collector 10.

A potential bias is applied to emitter 108 from the junction of resistors 112 and 114 which are connected between source −V and ground. In the quiescent condition of the multivibrator, these bias potentials establish a condition of current saturation in transistor 106 and a relatively low potential at collector 110. However, in the transient condition of the multivibrator, the bias potential applied to base 104 together with the potential applied to emitter 108 are effective to cut-off transistor 106.

In accordance with another feature of this invention an integrating component circuit including a capacitor 116 in parallel with a series connection of resistor 118 and variable resistor 120 is connected between potential source +V and collector 106. A driver transistor 122 of the PNP junction type is connected in circuit as an emitter follower and has its collector 124 connected to negative potential source, −V, its base 126 connected to collector 10 and its base connected to positive potential source through series connected resistors 128 and 130. It is observed that the potential across the integrator circuit 116, 118, and 120 is applied to the base-emitter junction of the transistor 122. As noted hereinabove, in the quiescent condition of the described multivibrator, transistor 106 is biased so as to be heavily conducting. In this circumstance, its collector is at a relatively low value as represented at time *t*1, on wave form 121 in FIGURE 4 of the drawings. Thus, capacitor 116 becomes charged with its terminal which is connected to collector 10 being negative with respect to its other terminal. However, in response to a change in condition of the multivibrator from its quiescent to its transient condition, transistor 106 becomes cut-off and capacitor 116 begins to gradually discharge through resistors 118 and 120. The time constant of this discharge circuit is established to maintain a potential at collector 110 sufficiently low during a predetermined number of input pulses so as to maintain transistor 122 in conduction. However, at time *t*2, after a considerable number of input pulses have been applied, here realistically shown as being approximately five in number, capacitor 116 has discharged to the point at which the potential at base 126 is near zero.

For producing an output potential in response to the reception of this plurality of input pulses to indicate the recognition of a selection bit group, a controlled rectifier element 132 is provided and has a first N type emitter 134 which is grounded, a second P type emitter 136 coupled to counter 36 and a P type base 138 connected to the junction between resistors 128 and 130. An N type base 140 is unconnected to any external element. As the conduction of transistor 122 is gradually reduced during the discharge of capacitor 116 as explained hereinabove, the potential at its emitter follows its base potential and thus, the potential at base 138 of rectifier 132 also gradually increases. After the potential at base 138 reaches a value near ground potential as shown at time *t*2 on wave form 121 in FIGURE 4 of the drawings, the rectifier 132 begins relatively heavy conduction and remains in this state of relatively heavy conduction irrespective of the potential applied to base 138. In this sense, the rectifier is analagous to a gas filled triode tube in which the grid loses control after it is "fired." The potential at the output electrode which is connected to emitter 136 is represented by wave form 135 in FIGURE 4 of the drawings. For suppression of noise that may exist in the output line connected to circuit 36, a capacitor 142 is connected between emitter 136 and ground. A diode element 144 is similarly connected between emitter 136 and ground with its anode grounded to prevent the emitter 136 from assuming negative potentials.

Subsequent to the application of an output potential from rectifier 132, the current therein is interrupted by any suitable means, not shown, and the circuit including the monostable multivibrator, due to the absence of input pulses, reverts to a quiescent condition in readiness for another burst of input pulses to produce a single output potential. To aid in the re-charging of capacitor 116, a diode element 133 has its cathode which is represented by a straight line connected to the junction between resistors 128 and 130 and its anode connected to one terminal of this capacitor.

Saturation current in transistor 122 establishes a negative potential at the cathode of diode 133 relative to its anode whereby the capacitor 116 is prevented from completely discharging.

From the foregoing description it is observed that the circuit 34 is effective to respond to a predetermined, relatively large number of bits of information "read" on the channel 30 by the magnetic head, to produce an output potential indicative of the passage of a message on the recording tape. Since the information on the magnetic tape "read" by the magnetic head is "read" at the same relative speed between these members irrespective of whether the movement is transverse or longitudinal with respect to the tape, a considerable saving in time is achieved in accordance with the message selection of this invention. Purely as an example, the reading of information by successive transverse movements of the head may be at a rate of 20 rows per second on a tape having 20 rows per inch. The tape advance thus would be at the rate of one inch per second but in reading the information along channel 30 for message selection, the tape would be advanced at a rate of 45 inches per second. The time saved in selecting certain messages, particularly on long tapes containing many messages recorded thereon is obvious.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus for selecting a particular data message on an elongated record medium having a plurality of data messages recorded in data bit channels with each message being indicated by an associated group of selection bits recorded in sequence in a separate selection channel and with each selection bit group having a predetermined number of bits that is greater in number than the maximum number of noise bits likely to be encountered during operation of the apparatus, comprising:

transducer means for scanning said selection channel, said transducer means supplying an impulse whenever it senses a selection bit in said selection bit channel;

means for driving said record medium so that the selection bit groups are presented sequentially by group and by bit in order to derive individual series of impulses from said transducer means that correspond exactly in number and sequence to the number and sequence of bits in the selection bit groups of said selection channel;

integrating means responsive to each series of selection impulses from said transducer means only when they exceed said maximum number to supply a recognition signal to indicate that an individual selection bit group and the data message associated therewith has been encountered;

counting means, said counting means being initially conditioned to a count status representing the difference in number between a desired message and the message location at which said record medium is positioned in relation to said transducer, and said counting means being responsive at its input to a number of recognition signals from said integrating means corresponding to said difference number to supply an output potential indicative that the desired message has been located;

and control means activated by an output potential from said counting means to interrupt said driving means and thereby stop said apparatus in position to read said desired data message.

2. Apparatus for selecting a particular data message on a magnetic record tape having a plurality of data messages recorded in data bit channels with each message being indicated by an associated group of selection bits recorded in sequence in a separate selection channel and with each selection bit group having a predetermined number of bits that is greater in number than a maximum number of noise bits likely to be encountered during operation of the apparatus, comprising:

a magnetic head for scanning said selection channel said magnetic head supplying an impulse whenever it senses a selection bit in said selection bit channel;

means for driving said magnetic record tape so that the selection bit groups are presented sequentially by group and by bit in order to derive individual series of impulses from said magnetic head that correspond exactly in number and sequence to the number and sequence of bits in the selection bit groups of said selection channel;

integrating means responsive to each series of selection impulses from said magnetic head means only when they exceed said maximum number to supply a recognition signal to indicate that an individual selection bit group and the data message associated therewith has been encountered;

counting means, said counting means being initially conditioned to a count status representing the difference in number between a desired message and the message location at which said magnetic record tape is positioned in relation to said magnetic head, and said counting means being responsive at its input to a number of recognition signals from said integrating means corresponding to said difference number to supply an output potential indicative that the desired message has been located;

and control means activated by an output potential from said counting means to interrupt said driving means and thereby stop said apparatus in position to read said desired data message.

3. The apparatus of claim 2 wherein each selection bit group comprises a predetermined number of selection bits that is considerably greater in number than said maximum number, and wherein said integrating circuit is responsive to any selection bit impulse series having a number of impulses that falls within the range between said maximum number and said predetermined number to supply a recognition signal to said counting means.

References Cited by the Examiner

UNITED STATES PATENTS

| | | | |
|---|---|---|---|
| 2,782,398 | 2/57 | West et al. | 346—74 |
| 3,016,522 | 1/62 | Lourie et al. | 340—174.1 |
| 3,105,963 | 10/63 | Stevens et al. | 340—174.1 |
| 3,123,810 | 3/64 | Strauch et al. | 340—174.1 |

IRVING L. SRAGOW, *Primary Examiner.*